US010698251B2

(12) United States Patent
Chu et al.

(10) Patent No.: US 10,698,251 B2
(45) Date of Patent: Jun. 30, 2020

(54) DISPLAY PANEL AND DISPLAY DEVICE INCLUDING THE SAME

(71) Applicant: Samsung Display Co., Ltd., Yongin-Si, Gyeonggi-Do (KR)

(72) Inventors: Seung-jin Chu, Cheonan-si (KR); Hoon Kim, Suwon-si (KR); Wontae Kim, Suwon-si (KR); Yeogeon Yoon, Suwon-si (KR); Hee-keun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/275,209

(22) Filed: Feb. 13, 2019

(65) Prior Publication Data

US 2019/0258109 A1 Aug. 22, 2019

(51) Int. Cl.
*G02F 1/1335* (2006.01)
*G02F 1/13357* (2006.01)

(52) U.S. Cl.
CPC .. *G02F 1/133514* (2013.01); *G02F 1/133512* (2013.01); *G02F 1/133528* (2013.01); *G02F 1/133617* (2013.01); *G02F 2001/133531* (2013.01); *G02F 2001/133548* (2013.01); *G02F 2001/133565* (2013.01); *G02F 2001/133614* (2013.01)

(58) Field of Classification Search
None
See application file for complete search history.

(56) References Cited

U.S. PATENT DOCUMENTS

| 2017/0076678 | A1* | 3/2017 | Lee .................. G02F 1/133512 |
| 2017/0082892 | A1 | 3/2017 | Chung |
| 2017/0287383 | A1 | 10/2017 | Hasegawa et al. |
| 2018/0019238 | A1 | 1/2018 | Kim et al. |
| 2018/0129098 | A1 | 5/2018 | Yoon et al. |
| 2018/0202616 | A1 | 7/2018 | Yoon et al. |
| 2018/0231843 | A1 | 8/2018 | Park et al. |

FOREIGN PATENT DOCUMENTS

| JP | 2013-114032 A | 6/2013 |
| JP | 2017-037121 A | 2/2017 |
| JP | 2017-181701 A | 10/2017 |
| KR | 10-2017-0034055 A | 3/2017 |
| KR | 10-1720896 B1 | 3/2017 |
| KR | 10-2018-0046969 A | 5/2018 |
| KR | 10-2018-0094200 A | 8/2018 |

* cited by examiner

*Primary Examiner* — Richard H Kim
(74) *Attorney, Agent, or Firm* — Innovation Counsel LLP (57) ABSTRACT

A display panel includes a first display substrate, a second display substrate. The second display substrate includes a substrate, a color conversion layer including a first conversion part configured to absorb light of a first color and to emit light of a second color, a second conversion part configured to absorb the light of the first color and to emit light of a third color, and a third conversion part configured to transmit the light of the first color, and a filter layer including a first filter overlapping with the first conversion part and having the second color, a second filter overlapping with the second conversion part and having the third color, a third filter overlapping with the third conversion part and having the first color, and an auxiliary filter overlapping with the second conversion part and configured to absorb the light of the first color.

20 Claims, 5 Drawing Sheets

DISPLAY PANEL AND DISPLAY DEVICE INCLUDING THE SAME

CROSS-REFERENCE TO RELATED APPLICATION

This U.S. non-provisional patent application claims priority under 35 U.S.C. § 119 to Korean Patent Application No. 10-2018-0021131, filed on Feb. 22, 2018, the entire contents of which are hereby incorporated by reference.

BACKGROUND

The present disclosure herein relates to a display device, and more particularly, to a display panel and a display device including the same.

Various display devices used in multimedia devices such as televisions, portable phones, tablet computers, navigation systems, and game consoles have been developed. In addition, photo-luminescent liquid crystal display devices increasing light efficiency and improving color balance have been developed.

When various display devices are used in an outdoor environment under strong external light, the external light may be reflected and scattered at display surfaces of the display devices. Thus, colors of some components included in a display device may be visible through a display surface by the external light.

SUMMARY

The present disclosure may provide a display panel capable of preventing an internal component of the display panel from being visible by light incident from the outside, and a display device including the same.

In an embodiment of the inventive concepts, a display panel includes a first display substrate, a second display substrate, and a liquid crystal layer disposed between the first display substrate and the second display substrate. The second display substrate includes a substrate, a color conversion layer disposed between the substrate and the liquid crystal layer and including a first conversion part configured to absorb light of a first color and to emit light of a second color, a second conversion part configured to absorb the light of the first color and to emit light of a third color, and a third conversion part configured to transmit the light of the first color, and a filter layer disposed between the substrate and the color conversion layer and including a first filter overlapping with the first conversion part and having the second color, a second filter overlapping with the second conversion part and having the third color, a third filter overlapping with the third conversion part and having the first color, and an auxiliary filter overlapping with the second conversion part and configured to absorb the light of the first color.

In an embodiment, the auxiliary filter may be disposed between the second conversion part and the second filter.

In an embodiment, the auxiliary filter may have a fourth color, and a wavelength range of light of the fourth color may not overlap with a wavelength range of the light of the first color.

In an embodiment, the wavelength range of the light of the first color may partially overlap with a wavelength range of the light of the third color, and the wavelength range of the light of the first color may not overlap with a wavelength range of the light of the second color.

In an embodiment, the first color may be a blue color, and the fourth color may be a yellow color.

In an embodiment, the second color may be a red color, and the third color may be a green color.

In an embodiment, the auxiliary filter may be an organic layer.

In an embodiment, a thickness of the auxiliary filter in a thickness direction of the substrate may range from about 0.3 micrometers ($\mu$m) to about 2 micrometers ($\mu$m).

In an embodiment, the auxiliary filter may include a first auxiliary filter overlapping with the second conversion part, and a second auxiliary filter overlapping with the first conversion part.

In an embodiment, the first auxiliary filter may be disposed between the second conversion part and the second filter, and the second auxiliary filter may be disposed between the first conversion part and the first filter.

In an embodiment, the first conversion part may include a first illuminant that is configured to absorb the light of the first color and to emit the light of the second color, and the second conversion part may include a second illuminant that is configured to absorb the light of the first color and to emit the light of the third color.

In an embodiment, a particle size of the first illuminant may be different from a particle size of the second illuminant.

In an embodiment, the display panel may further include a light blocking member disposed between adjacent filters among the first to third filters.

In an embodiment, the display panel may further include a polarizing layer disposed on the first display substrate, and an in-cell polarizing layer disposed between the color conversion layer and the liquid crystal layer. The in-cell polarizing layer may include a plurality of wire grid patterns.

In an embodiment, the polarizing layer may have a first polarization axis, and the in-cell polarizing layer may have a second polarization axis perpendicular to the first polarization axis.

In an embodiment of the inventive concepts, a display device includes a display panel, and a light source configured to provide light of a first color to the display panel. The display panel includes a first substrate, a second substrate, a liquid crystal layer disposed between the first substrate and the second substrate, a color conversion layer disposed between the second substrate and the liquid crystal layer and including a first conversion part configured to absorb the light of the first color and to emit light of a second color, a second conversion part configured to absorb the light of the first color and to emit light of a third color, and a third conversion part configured to transmit the light of the first color, and a filter layer disposed between the second substrate and the color conversion layer and including a first filter overlapping with the first conversion part in a plan view and having the second color, a second filter overlapping with the second conversion part in a plan view and having the third color, and an auxiliary filter overlapping with the second conversion part in a plan view and configured to absorb the light of the first color.

In an embodiment, the filter layer may further include a third filter overlapping with the third conversion part in a plan view and having the first color.

In an embodiment, the auxiliary filter may include a first auxiliary filter overlapping with the second conversion part, and a second auxiliary filter overlapping with the first conversion part.

In an embodiment, the auxiliary filter may have a fourth color, and a wavelength range of light of the fourth color may not overlap with a wavelength range of the light of the first color.

In an embodiment, the first color may be a blue color, and the fourth color may be a yellow color.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings.

DETAILED DESCRIPTION OF THE EMBODIMENTS

The inventive concepts now will be described more fully hereinafter with reference to the accompanying drawings, in which various embodiments are shown. The inventive concepts may, however, be embodied in many different forms, and should not be construed as limited to the embodiments set forth herein. Rather, these embodiments are provided so that this disclosure will be thorough and complete, and will fully convey the scopes of the inventive concepts to those skilled in the art. Like reference numerals refer to like elements throughout. It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Figure 1:
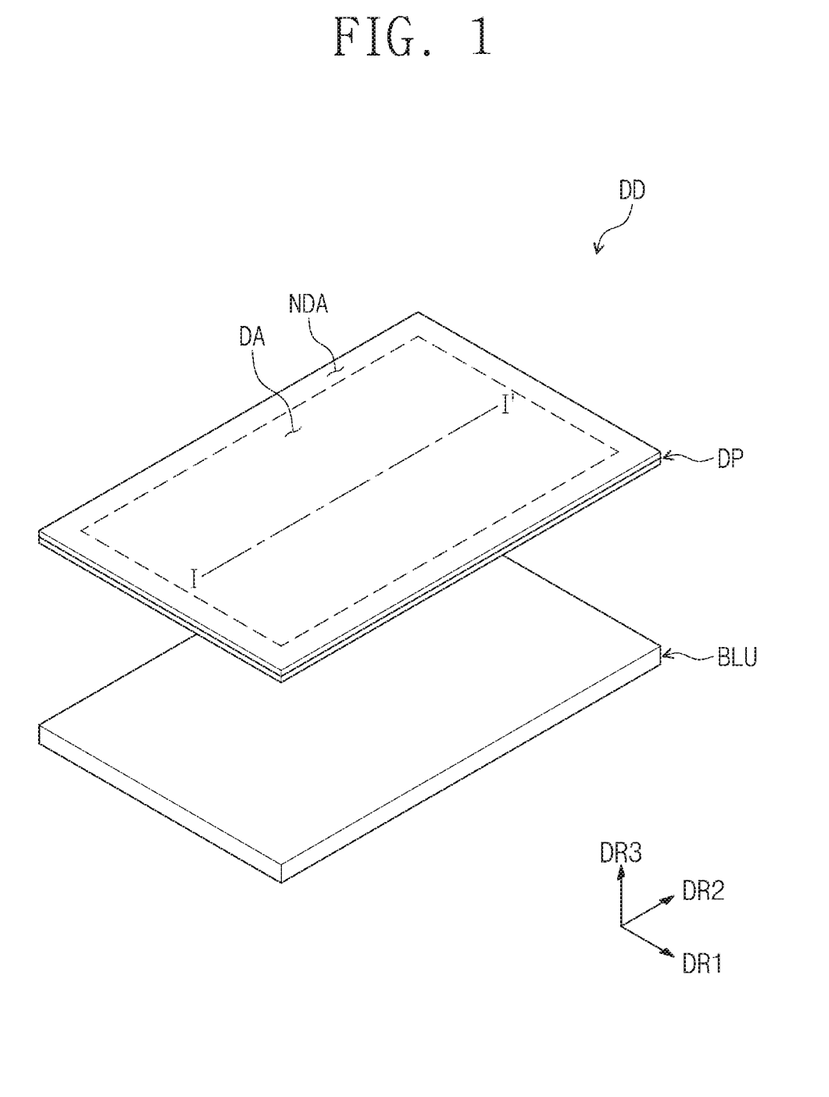
FIG. 1 is an exploded perspective view illustrating a display device according to an embodiment of the inventive concepts.
Figure 2:
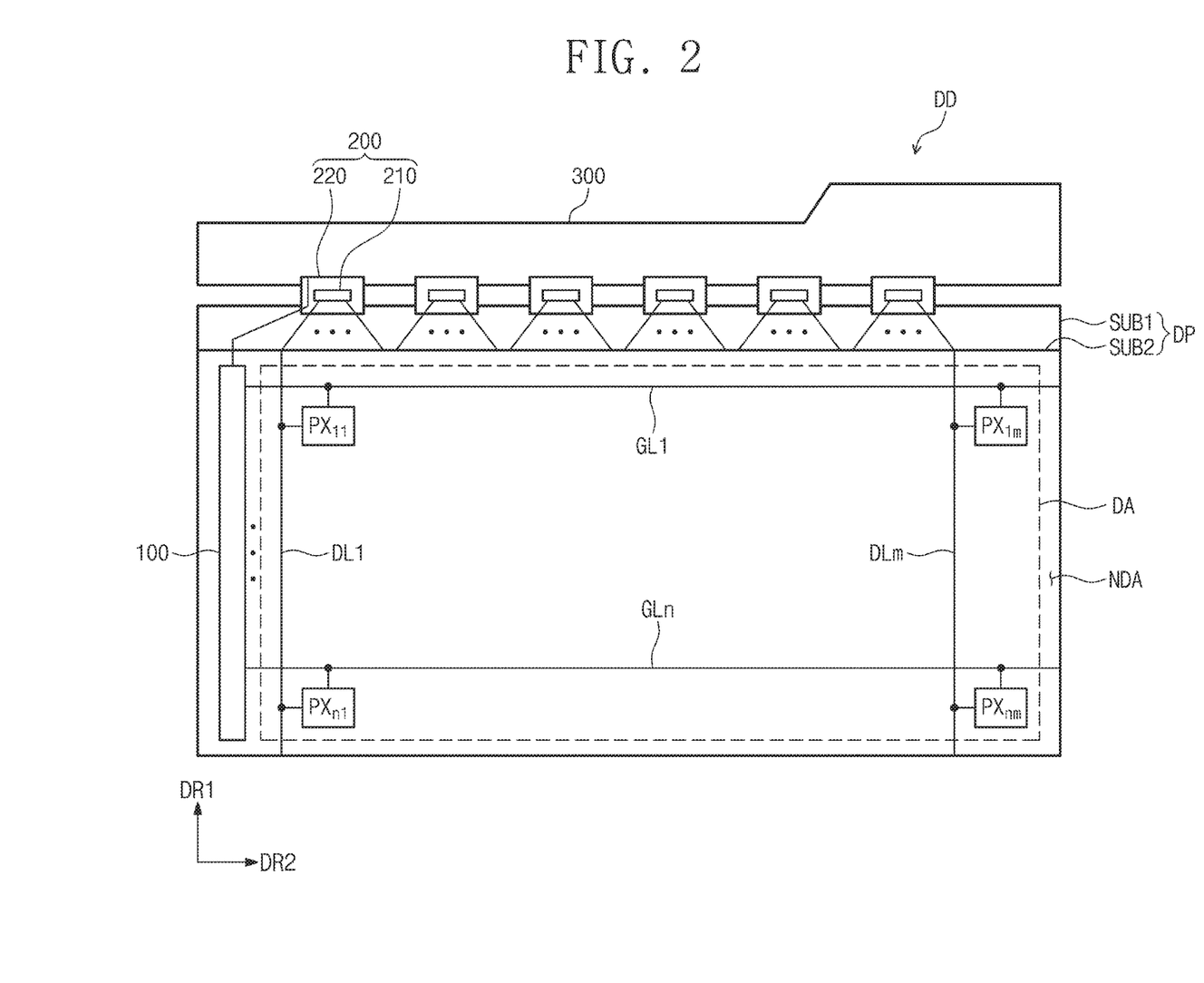
FIG. 2 is a plan view illustrating a display device according to an embodiment of the inventive concepts.

FIG. 1 is an exploded perspective view illustrating a display device according to an embodiment of the inventive concepts. FIG. 2 is a plan view illustrating a display device according to an embodiment of the inventive concepts.

Referring to FIG. 1, a display device DD may include a display panel DP and a light source BLU configured to provide light to the display panel DP. The display panel DP may provide an image, and the light source BLU may generate light of a first color (hereinafter, referred to as 'first color light').

The light source BLU may be disposed under the display panel DP and may provide the first color light to the display panel DP. For example, the first color light provided from the light source BLU may be blue light. Alternatively, the first color light may be ultraviolet light. For example, the light source BLU may provide light of which a wavelength ranges from 400 nm to 520 nm.

The light source BLU may include a plurality of light emitting elements. The light emitting elements may emit blue light as the first color light. The light source BLU may include the plurality of light emitting elements and a circuit board configured to provide power to the light emitting elements. The light emitting elements may be disposed on the circuit board.

The first color light generated from the light source BLU may be provided to the display panel DP. The display panel DP may be disposed on the light source BLU. The display panel DP may include a display area DA displaying an image and a non-display area NDA not displaying an image. The non-display area NDA may be disposed adjacent to the display area DA. In an embodiment, the non-display area NDA may surround the display area DA when viewed in a plan view.

According to embodiments of the inventive concepts, the display panel DP may be provided as a liquid crystal display panel, an organic light emitting display panel, a plasma display panel, an electrophoretic display panel, a microelectromechanical system (MEMS) display panel, or an electrowetting display panel.

The embodiment in which the display panel DP is the liquid crystal display panel will be described hereinafter. The display panel DP may be a twisted nematic liquid crystal display panel, a horizontal alignment type liquid crystal display panel, or a vertical alignment type liquid crystal display panel. In some embodiments, the display panel DP according to the inventive concepts may be provided as the vertical alignment type liquid crystal display panel in which liquid crystal molecules are aligned in a predetermined direction and long axes of the liquid crystal molecules are vertical to a surface of a substrate, in a state where an electric field is not applied.

The display panel DP is parallel to a plane defined by a first direction DR1 and a second direction DR2. A normal direction of the display panel DP is indicated by a third direction DR3. The third direction DR3 indicates a thickness direction of the display panel DP. A top surface (or a front surface) and a bottom surface (or a rear surface) of each of members are defined by the third direction DR3. However, directions indicated by the first to third directions DR1, DR2 and DR3 may be relative concepts and may be changed into other directions.

Meanwhile, the display device DD having a flat shape is illustrated in FIG. 1. However, embodiments of the inventive concepts are not limited thereto. In another embodiment, the display device DD may be a curved display device. For example, the display device DD may be a curved display device which is wholly concavely or convexly curved when a user views the display device. Alternatively, the display device DD may be a display device of which only a portion is bent.

In an embodiment, the display device DD may be a flexible display device. For example, the display device DD may be a foldable display device or a rollable display device.

Referring to FIG. 2, the display panel DP may include the display area DA in which a plurality of pixels $PX_{11}$ to $PX_{nm}$ is disposed, and the non-display area NDA surrounding the display area DA in a plan view.

A first display substrate SUB1 may include a plurality of gate lines GL1 to GLn and a plurality of data lines DL1 to DLm intersecting the gate lines GL1 to GLn. Some of the plurality of gate lines GL1 to GLn and some of the plurality of data lines DL1 to DLm are illustrated in FIG. 2 for the purpose of ease and convenience in illustration. However, even though not shown in the drawings, the first display substrate SUB1 may also include pixel electrodes required to drive the pixels.

The plurality of gate lines GL1 to GLn may be connected to a gate driving circuit 100 and may sequentially receive gate signals from the gate driving circuit 100. The plurality of data lines DL1 to DLm may be connected to a data driving circuit 200 and may receive analog data signals (or data voltages) from the data driving circuit 200.

Each of the pixels $PX_{11}$ to $PX_{nm}$ may be connected to a corresponding one of the plurality of gate lines GL1 to GLn and a corresponding one of the plurality of data lines DL1 to DLm.

The gate driving circuit 100 may be formed simultaneously with the pixels $PX_{11}$ to $PX_{nm}$ by thin film processes. For example, the gate driving circuit 100 may be integrated in the non-display area NDA of the display panel DP by an oxide silicon gate driving circuit (OSG) process or an amorphous silicon gate driving circuit (ASG) process.

According to the embodiment of FIG. 2, the gate driving circuit 100 is connected to left ends of the gate lines GL1 to GLn. However, embodiments of the inventive concepts are not limited thereto. In another embodiment, the display device DD may include two gate driving circuits. In an embodiment, one of the two gate driving circuits may be connected to left ends of the gate lines GL1 to GLn, and the other of the two gate driving circuits may be connected to right ends of the gate lines GL1 to GLn. In an embodiment, one of the two gate driving circuits may be connected to odd-numbered gate lines, and the other of the two gate driving circuits may be connected to even-numbered gate lines.

The data driving circuit 200 may receive data signals from a signal controller (not shown) mounted on a circuit board 300 and may generate analog data signals corresponding to the data signals.

The data driving circuit 200 may include a driving chip 210 and a flexible circuit board 220 on which the driving chip 210 is mounted. Each of the driving chip 210 and the flexible circuit board 220 may be provided in plurality. The flexible circuit board 220 may electrically connect the circuit board 300 and the first display substrate SUB1 to each other. Each of the driving chips 210 may provide some of the data signals to corresponding ones of the data lines DL1 to DLm.

The data driving circuit 200 formed in the form of a tape carrier package (TCP) is illustrated as an example in FIG. 2. Alternatively, the data driving circuit 200 may be mounted on the first display substrate SUB1 by a chip-on-glass (COG) method.

A second display substrate SUB2 may be disposed on the first display substrate SUB1. Even though not shown in the drawings, the second display substrate SUB2 may include a common electrode required to drive the pixels.

Figure 3A:
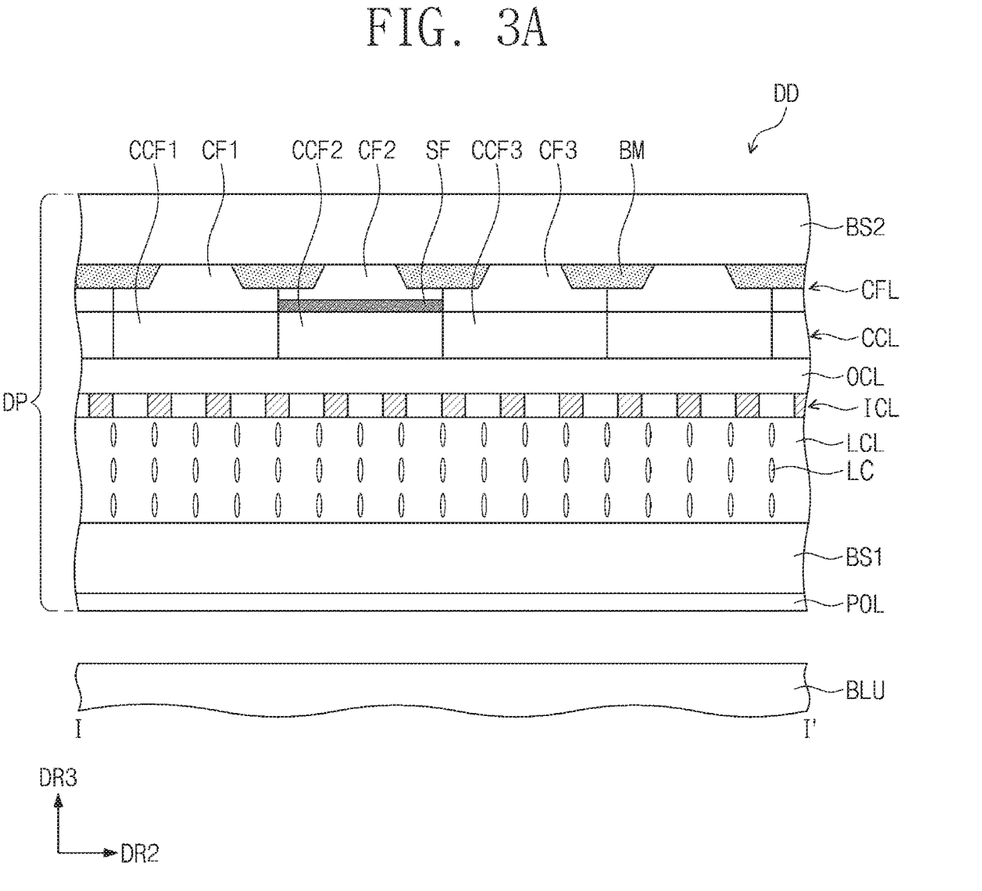
FIG. 3A is a cross-sectional view taken along a line I-I' of FIG. 1.
Figure 3B:
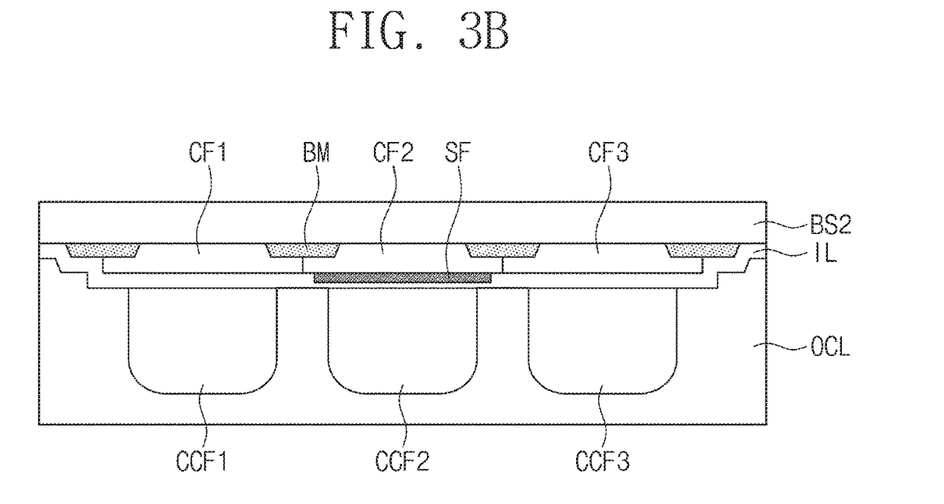
FIG. 3B is an enlarged cross-sectional view of a portion of FIG. 3A.
Figure 4:
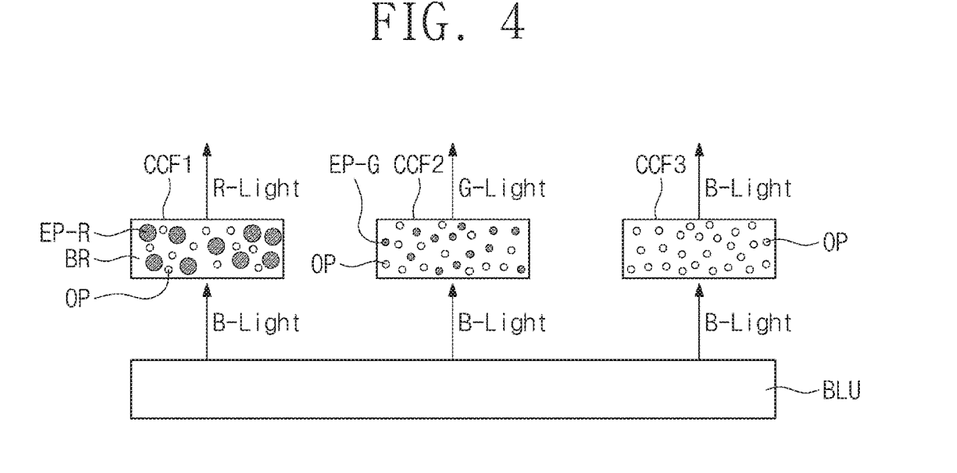
FIG. 4 is a schematic view illustrating optical characteristics of conversion parts according to an embodiment of the inventive concepts.
Figure 5:
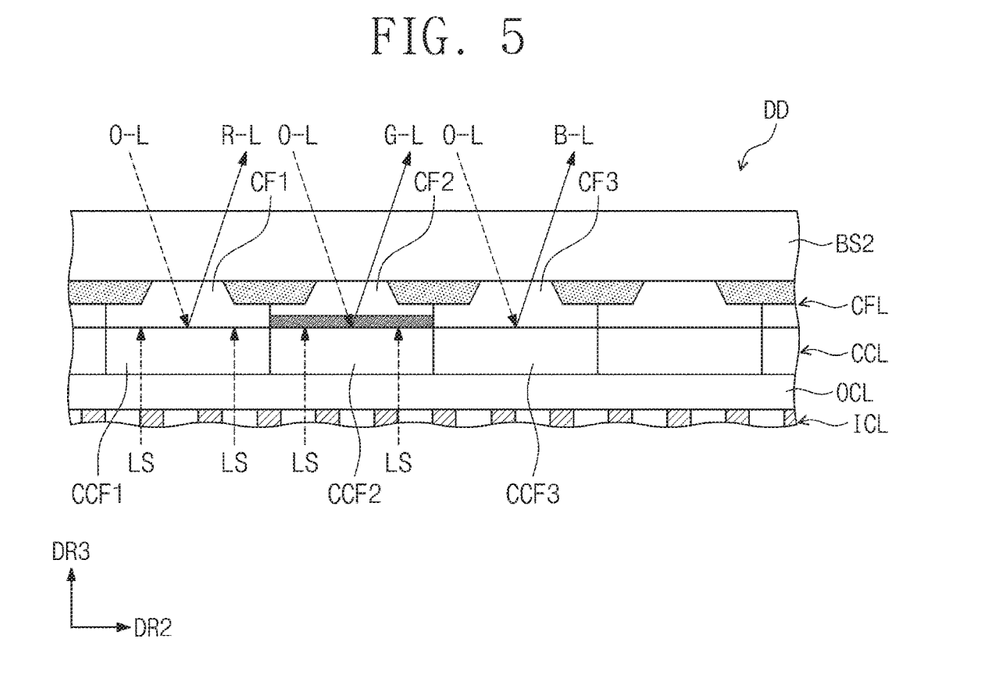
FIG. 5 is a partial cross-sectional view of a display panel to illustrate characteristics of a filter layer according to an embodiment of the inventive concepts.
Figure 6:
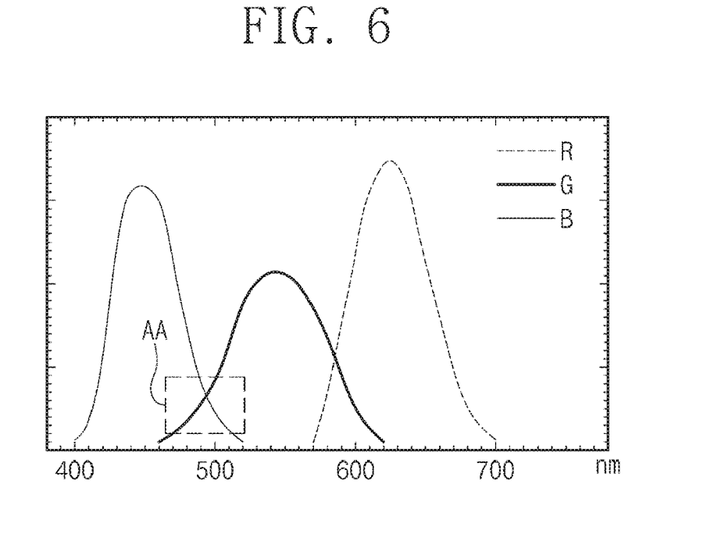
FIG. 6 is a graph illustrating wavelength characteristics of colors of a filter layer.

FIG. 3A is a partial cross-sectional view taken along a line I-I' of FIG. 1. FIG. 3B is an enlarged cross-sectional view of a portion of FIG. 3A. FIG. 4 is a schematic view illustrating optical characteristics of conversion parts according to an embodiment of the inventive concepts. FIG. 5 is a partial cross-sectional view of a display panel to illustrate characteristics of a filter layer according to an embodiment of the inventive concepts. FIG. 6 is a graph illustrating wavelength characteristics of colors of a filter layer.

Referring to FIG. 3A, a cross-sectional view of the display panel DP overlapping with the display area DA is illustrated as an example. The display panel DP may include the first and second display substrates SUB1 and SUB2 described with reference to FIG. 2, a liquid crystal layer LCL, an in-cell polarizing layer ICL, and a polarizing layer POL. The first and second display substrates SUB1 and SUB2 may face each other.

The first display substrate SUB1 may include a first substrate BS1. The first substrate BS1 may include a polymer substrate, a plastic substrate, a glass substrate, or a quartz substrate. The first substrate BS1 may be a transparent insulating substrate. The first substrate BS1 may be rigid or flexible. In FIG. 3A, the first display substrate SUB1 includes only the first substrate BS1. However, embodiments of the inventive concepts are not limited thereto. The first display substrate SUB1 may further include a circuit layer including the data lines, the gate lines and the pixels, described with reference to FIG. 2.

The second display substrate SUB2 may include a second substrate BS2, a color conversion layer CCL, a filter layer CFL, and an overcoating layer OCL.

The second substrate BS2 may include a polymer substrate, a plastic substrate, a glass substrate, or a quartz substrate. The second substrate BS2 may also be a transparent insulating substrate. The second substrate BS2 may be rigid or flexible.

Meanwhile, even though not shown in the drawings, the first substrate BS1 and the second substrate BS2 may have the pixel electrode and the common electrode, respectively. For example, the pixel electrode (not shown) may be disposed on a top surface of the first substrate BS1. The common electrode (not shown) may be disposed on a bottom surface of the second substrate BS2. Here, the top surface of the first substrate BS1 may be disposed adjacent to the liquid crystal layer LCL and may face the second substrate BS2. The bottom surface of the second substrate BS2 may be disposed adjacent to the liquid crystal layer LCL and may face the first substrate BS1.

The liquid crystal layer LCL may be disposed between the first and second substrates BS1 and BS2 and may include a plurality of liquid crystal molecules LC. The liquid crystal molecules LC having dielectric anisotropy may be arranged to constitute the liquid crystal layer LCL. Commonly used liquid crystal molecules may be used as the liquid crystal molecules LC of the liquid crystal layer LCL, and the liquid crystal molecules LC are not limited to specific liquid crystal molecules. For example, the liquid crystal molecules LC may be formed of an alkenyl-based liquid crystal compound or an alkoxy-based liquid crystal compound. The liquid crystal molecules LC used in the embodiments of the inventive concepts may have negative dielectric anisotropy. However, embodiments of the inventive concepts are not limited thereto. In other embodiments, the liquid crystal molecules LC having positive dielectric anisotropy may be used in the liquid crystal layer LCL.

The color conversion layer CCL may be disposed between the liquid crystal layer LCL and the second substrate BS2. The color conversion layer CCL may be disposed on the bottom surface of the second substrate BS2. The color conversion layer CCL may include an illuminant that is configured to absorb the first color light provided from the light source BLU and to emit light of a color different from the first color.

In detail, referring to FIG. 4, the color conversion layer CCL may include a first conversion part CCF1 including a first illuminant EP-R, a second conversion part CCF2 including a second illuminant EP-G, and a third conversion part CCF3 transmitting the first color light.

For example, the first illuminant EP-R may absorb the first color light (e.g., the blue light B-Light) and may emit red light R-Light. The second illuminant EP-G may absorb the first color light (e.g., the blue light B-Light) and may emit green light G-Light. Hereinafter, the red light is referred to as 'second color light', and the green light is referred to as 'third color light'. In other words, the first conversion part CCF1 may be a light emitting area emitting the red light, and the second conversion part CCF2 may be a light emitting area emitting the green light.

The third conversion part CCF3 may not include an illuminant. The third conversion part CCF3 may transmit the first color light provided from the light source BLU. In other words, the third conversion part CCF3 may be a light emitting area emitting the blue light.

Each of the first to third conversion parts CCF1, CCF2 and CCF3 may include a base resin BR. The base resin BR may be a polymer resin. For example, the base resin BR may be an acrylic-based resin, a urethane-based resin, a silicon-based resin, or an epoxy-based resin. The base resin BR may be a transparent resin.

The first to third conversion parts CCF1, CCF2, and CCF3 may further include scattering particles OP. The scattering particles OP may be $TiO_2$ or silica-based nano-particles. The scattering particles OP may scatter light emitted from the illuminant in such a way that the scattered light is outputted to the outside of the conversion part. In the third conversion part CCF3, the light provided from the light source BLU is transmitted without changing a wavelength of the light, however, the scattering particles OP may scatter the provided light to output the provided light to the outside.

The first and second illuminants EP-R and EP-G included in the color conversion layer CCL may be fluorescent substances or quantum dots. In other words, in an embodiment, the color conversion layer CCL may include at least one of the fluorescent substances or the quantum dots as the illuminants EP-R and EP-G.

For example, the fluorescent substances used as the illuminants EP-R and EP-G may be inorganic fluorescent substances. In the display device DD according to an embodiment, the fluorescent substances used as the illuminants EP-R and EP-G may be a red fluorescent substance and a green fluorescent substance.

In other embodiments, the illuminants EP-R and EP-G included in the color conversion layer CCL may be the quantum dots. The quantum dot may be formed of a group II-VI compound, a group III-V compound, a group IV-VI compound, a group IV element, a group IV compound, or any combination thereof.

The quantum dot may have a core-shell structure including a core and a shell surrounding the core. Alternatively, the quantum dot may have a core/shell structure in which one quantum dot surrounds another quantum dot. An interface of the core and the shell may have a concentration gradient in which a concentration of an element existing in the shell becomes progressively less toward a center.

The quantum dot may be a nano-sized particle. The quantum dot may have a full width of half maximum (FWHM) of an emission wavelength spectrum that is about 45 nm or less (in particular, about 40 nm or less, and in more particular, about 30 nm or less), and color purity and/or color reproduction may be improved in the range. In addition, light emitted through the quantum dot may be emitted in all directions, and thus a wide viewing angle may be improved or realized.

Furthermore, a shape of the quantum dot may be a general shape known in the art but is not limited to a specific shape. For example, the quantum dot may have a spherical shape, a pyramidal shape, a multi-arm shape, a cubic nanoparticle shape, a nanotube shape, a nanowire shape, a nanofiber shape, or a nano-plate particle shape.

According to an embodiment of the inventive concepts, a color of light emitted from the quantum dot may be changed depending on a particle size of the quantum dot. When the first illuminant EP-R and the second illuminant EP-G are the quantum dots, a particle size of the first illuminant EP-R may be different from a particle size of the second illuminant EP-G. For example, the particle size of the first illuminant EP-R may be greater than the particle size of the second illuminant EP-G. In this case, a wavelength of light emitted from the first illuminant EP-R may be longer than a wavelength of light emitted from the second illuminant EP-G.

Referring to FIGS. 3A and 5, the overcoating layer OCL may be disposed between the color conversion layer CCL and the liquid crystal layer LCL. The color conversion layer CCL may have a top surface (or a front surface) disposed adjacent to the second substrate BS2 and a rear surface (or a bottom surface) disposed adjacent to the liquid crystal layer LCL, and the overcoating layer OCL may planarize the rear surface of the color conversion layer CCL.

In detail, the overcoating layer OCL may cover the color conversion layer CCL and may be disposed on an insulating layer IL, as illustrated in FIG. 3B. In addition, a bottom surface of the overcoating layer OCL, which is adjacent to the liquid crystal layer LCL, may be a flat surface. The insulating layer IL may cover the filter layer CFL and may be disposed on the bottom surface of the second substrate BS2. In another embodiment, the insulating layer IL may be omitted.

The polarizing layer POL may have a polarization axis in one direction, and the in-cell polarizing layer ICL may have a polarization axis in another direction perpendicular to the one direction.

The polarizing layer POL may be disposed on a bottom surface of the first substrate BS1. The polarizing layer POL may transmit light vibrating in parallel to the polarization axis in the one direction. The polarizing layer POL may be a polarizing layer formed by a coating method or a polarizing layer formed by a deposition method. For example, the polarizing layer POL may be formed by performing the coating method using a material including a dichroic dye and a liquid crystal compound.

The in-cell polarizing layer ICL may be disposed between the color conversion layer CCL and the liquid crystal layer LCL. The in-cell polarizing layer ICL may transmit light vibrating in parallel to the other direction perpendicular to the one direction.

In an embodiment, the in-cell polarizing layer ICL may include a metal. For example, the in-cell polarizing layer ICL may include at least one of aluminum (Al), silver (Ag), or molybdenum-titanium oxide (MTO).

In an embodiment, the in-cell polarizing layer ICL may include a plurality of wire grid patterns overlapping with the display area DA and a reflection pattern overlapping with the non-display area NDA.

The wire grid patterns may overlap with the display area DA to transmit light vibrating in parallel to the other direction perpendicular to the one direction.

The reflection pattern may overlap with the non-display area NDA and may reflect incident light. The reflection pattern may have a shape extending from the wire grid pattern. In an embodiment, the color conversion layer CCL may further include a dummy conversion part which overlaps with the non-display area NDA and is disposed on the bottom surface of the second substrate BS2.

The filter layer CFL may be disposed between the second substrate BS2 and the color conversion layer CCL. The filter layer CFL may include a first filter CF1, a second filter CF2, a third filter CF3, and an auxiliary filter SF.

The first to third filters CF1 to CF3 of the filter layer CFL may receive lights transmitted through the first to third conversion parts CCF1 to CCF3 of the color conversion layer CCL, respectively.

According to an embodiment of the inventive concepts, the first filter CF1 may have substantially the same color (e.g., the red color) as the second color light. As a result, the first filter CF1 may receive the second color light through the first conversion part CCF1 and may output the received second color light to the outside through the second substrate BS2.

Meanwhile, a portion of the first color light LS provided from the light source BLU may not be absorbed by the first illuminant EP-R but may be transmitted to the outside through the first conversion part CCF1 without changing a wavelength of the first color light LS. If the first filter CF1 between the second substrate BS2 and the first conversion part CCF1 is omitted, the portion of the first color light LS may be outputted to the outside through the second substrate BS2. Thus, light having the first color light LS and the second color light may be emitted to the outside which deteriorates display quality of an image. In other words, visibility of the color may be deteriorated.

However, according to the embodiment of the inventive concepts, the first filter CF1 may absorb the first color light LS transmitted through the first conversion part CCF1 as illustrated in FIG. 5, and thus the first color light LS may not be transmitted to the second substrate BS2 through the first filter CF1. As a result, the second color light emitted through the first conversion part CCF1 may be outputted to the outside through the second substrate BS2 without being mixed with light of another color, for example, the first color and thus the visibility of the color may be improved.

In addition, external light O-L may be transmitted from the outside of the display device DD to the display panel DP, as illustrated in FIG. 5. In particular, the external light O-L may be reflected at an interface between the filter layer and the color conversion layer CCL, for example, between the first filter CF1 and the first conversion part CCF1, and then may be outputted toward the second substrate BS2.

If the first filter CF1 between the second substrate BS2 and the first conversion part CCF1 is omitted, the external light O-L may be reflected by the first conversion part CCF1 and then may be mixed with the second color light emitted from the first conversion part CCF1. As a result, the external light O-L and the second color light may be partially mixed with each other to deteriorate display quality of an image. In other words, visibility of the color may be deteriorated.

However, according to the embodiment of the inventive concepts, the first filter CF1 may transmit a component, having the wavelength of the second color, of components of the external light O-L but may absorb the others of the components of the external light O-L. As a result, the first filter CF1 may transmit only light R-L, corresponding to the second color, of the external light O-L reflected by the first conversion part CCF1. Accordingly, only the second color light may be outputted toward the second substrate BS2 to improve the display quality of an image.

According to an embodiment of the inventive concepts, the second filter CF2 may have substantially the same color (e.g., the green color) as the third color light. As a result, the second filter CF2 may receive the third color light through the second conversion part CCF2 and may output the received third color light to the outside through the second substrate BS2.

Meanwhile, a portion of the first color light LS provided from the light source BLU may not be absorbed by the second illuminant EP-G but may be transmitted to the outside through the second conversion part CCF2 without changing a wavelength of the first color light LS. If the second filter CF2 between the second substrate BS2 and the second conversion part CCF2 is omitted, the portion of the first color light LS may be outputted to the outside through the second substrate BS2. Thus, light having the first color light LS and the third color light may be emitted to the outside which deteriorates the display quality of an image. In other words, the visibility of the color may be deteriorated.

However, according to the embodiment of the inventive concepts, the second filter CF2 may absorb the first color light LS transmitted through the second conversion part CCF2 as illustrated in FIG. 5, and thus the first color light LS may not be transmitted to the second substrate BS2 through the second filter CF2. As a result, the third color light emitted through the second conversion part CCF2 may be outputted to the outside through the second substrate BS2 without being mixed with light of another color for example, the first color, and thus the visibility of the color may be improved.

According to an embodiment of the inventive concepts, the auxiliary filter SF may be disposed between the second conversion part CCF2 and the second filter CF2. In an embodiment, the auxiliary filter SF may have a yellow color and may have a thickness of about 0.3 micrometers (μm) to about 2 micrometers (μm) in the third direction DR3. If the auxiliary filter SF has a thickness greater than about 2 micrometers (μm), a brightness of the third color light emitted from the second conversion part CCF2 may be reduced.

In the embodiment described above, the auxiliary filter SF is the filter having the yellow color. However, embodiments of the inventive concepts are not limited thereto. In other embodiments, the auxiliary filter SF may be an organic layer or may have at least one of various colors which do not overlap with the wavelength range of the first color. For example, when the auxiliary filter SF is the organic layer, the first color light may be absorbed or blocked by the organic layer and thus may not be transmitted to the second substrate BS2.

FIG. 6 is a graph showing wavelength characteristics of the red light, the green light and the blue light. Referring to FIG. 6, a horizontal axis of the graph shows a wavelength (nanometer, nm). For example, the blue light may have a wavelength range of about 400 nm to about 520 nm. The green light may have a wavelength range of about 450 nm to about 620 nm. The red light may have a wavelength range of about 600 nm to about 700 nm. Even though not shown in the drawings, the yellow light may have a wavelength range of about 550 nm to about 600 nm. In other words, the wavelength range of the yellow light does not overlap with the wavelength range of the blue light. Here, the term 'overlap' may mean that wavelength ranges of two color lights have the same area.

As shown in the graph of FIG. 6, the wavelength range of the green light and the wavelength range of the blue light may overlap with each other in an area AA. As a result, the first color light LS may not be fully absorbed by the second filter CF2, and a portion of the first color light LS may pass through the second filter CF2.

However, according to the embodiment of the inventive concepts, the auxiliary filter SF may be disposed between the second conversion part CCF2 and the second filter CF2, and thus the first color light LS transmitted through the second conversion part CCF2 may not be transmitted to the second substrate BS2 through the second filter CF2.

In addition, external light O-L may be transmitted from the outside of the display device DD to the display panel DP, as illustrated in FIG. 5. In particular, the external light O-L may be reflected at an interface between the second filter CF2 and the auxiliary filter SF and then may be outputted toward the second substrate BS2.

If the second filter CF2 is omitted, the color of the auxiliary filter SF may be visible to the outside through the display surface by the external light O-L.

However, according to the embodiment of the inventive concepts, the second filter CF2 may transmit a component, having the wavelength of the third color, of components of the external light O-L but may absorb the others of the components of the external light O-L. As a result, the second filter CF2 may transmit only light G-L, corresponding to the third color, of the external light O-L reflected by the auxiliary filter SF. Accordingly, only the third color light may be outputted toward the second substrate BS2 to improve the display quality of an image.

According to an embodiment of the inventive concepts, the third filter CF3 may have substantially the same color (e.g., the blue color) as the first color light. As a result, the third filter CF3 may receive the first color light through the third conversion part CCF3 and may output the received first color light to the outside through the second substrate BS2. However, in another embodiment, the third filter CF3 may be omitted.

In addition, external light O-L may be transmitted from the outside of the display device DD to the display panel DP, as illustrated in FIG. 5. In particular, the external light O-L may be reflected at an interface between the third filter CF3 and the third conversion part CCF3 of the color conversion layer CCL and then may be outputted toward the second substrate BS2.

If the third filter CF3 is omitted, the external light O-L may be reflected by the third conversion part CCF3 and then may be mixed with the first color light emitted from the third conversion part CCF3. As a result, the external light O-L and the first color light may be partially mixed with each other to deteriorate the display quality of an image. In other words, the visibility of the color may be deteriorated.

However, according to the embodiment of the inventive concepts, the third filter CF3 may transmit a component having the wavelength of the first color of the external light O-L but may absorb the others of the components of the external light O-L. As a result, the third filter CF3 may output only light B-L, corresponding to the first color, of the external light O-L reflected by the third conversion part CCF3 toward the second substrate BS2, and thus the display quality of an image may be improved.

A light blocking member BM may be disposed between the first to third filters CF1 to CF3. The light blocking member BM may have a black color and may be included in the filter layer CFL. The light blocking member BM may include an organic or inorganic light blocking material which includes a black pigment or dye. The light blocking member BM may prevent a leakage of light and may form a boundary between the conversion parts adjacent to each other.

Figure 7:
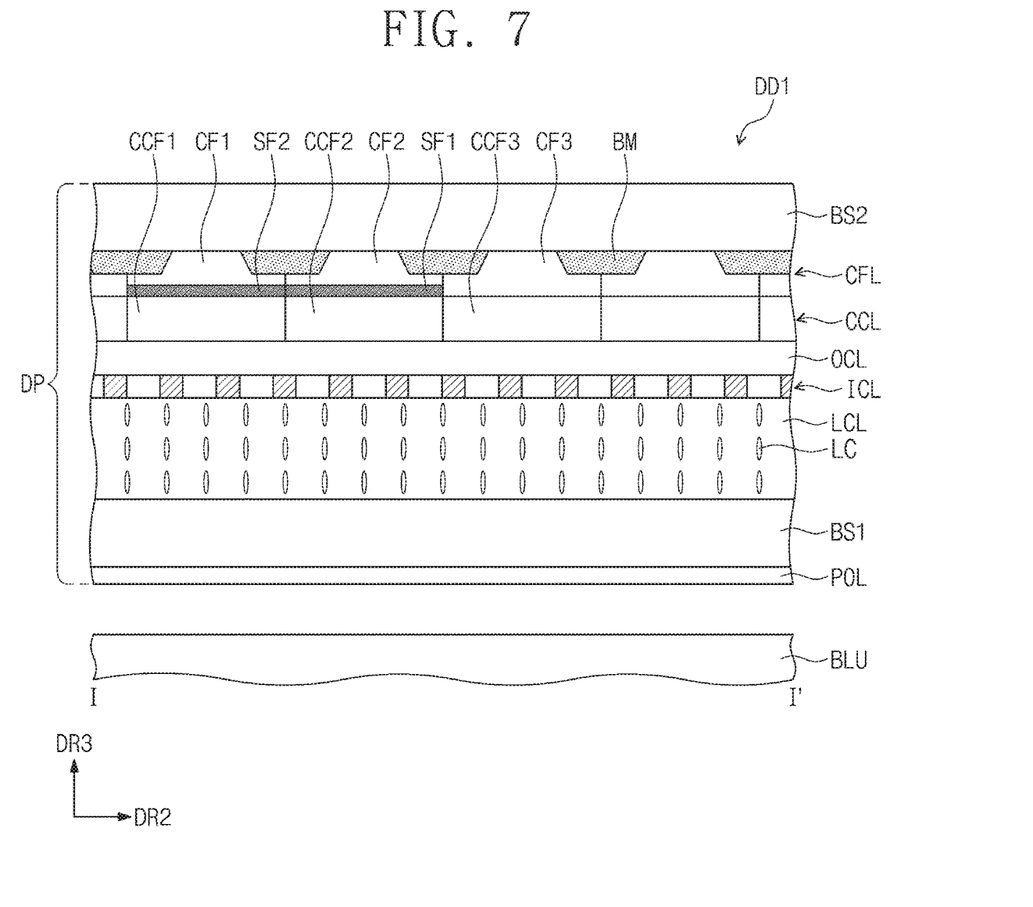
FIG. 7 is a cross-sectional view illustrating a display panel according to another embodiment of the inventive concepts.

FIG. 7 is a cross-sectional view illustrating a display panel according to another embodiment of the inventive concepts. A display device DD1 of FIG. 7 may further include a second auxiliary filter SF2, and other components of the display device DD1 may be substantially the same as those of the display device DD of FIG. 3A. Thus, the descriptions to the other components of the display device DD1 of FIG. 7 will be omitted.

Referring to FIG. 7, the filter layer CFL may include a first auxiliary filter SF1 overlapping with the second conversion part CCF2 and a second auxiliary filter SF2 overlapping with the first conversion part CCF1. The first auxiliary filter SF1 may be disposed on the second conversion part CCF2, and the second auxiliary filter SF2 may be disposed on the first conversion part CCF1.

The first and second auxiliary filters SF1 and SF2 may prevent the output of the first color light and may prevent the external light having different colors from being mixed with color lights emitted from the first conversion part CCF1 and the second conversion part CCF2.

Meanwhile, the color of the first and second auxiliary filters SF1 and SF2 may be visible to the outside through the display surface by the external light when the filter layer CFL is not exist. However, according to the embodiments of the inventive concepts, only third color light of the external light reflected by the first auxiliary filter SF1 may be outputted to the second substrate BS2 through the second filter CF2. In addition, only second color light of the external light reflected by the second auxiliary filter SF2 may be outputted to the second substrate BS2 through the first filter CF1.

According to some embodiments of the inventive concepts, the display panel may include the filter layer which prevents color mixing of the light outputted from the light source and the light emitted from the color conversion layer. As a result, overall visibility of the display device may be improved.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A display panel comprising:
   a first display substrate; and
   a second display substrate facing the first display substrate,
   wherein the second display substrate comprises:
   a substrate;
   a color conversion layer disposed on the substrate, the color conversion layer comprising:
      a first conversion part configured to absorb light of a first color and to emit light of a second color;
      a second conversion part configured to absorb the light of the first color and to emit light of a third color; and
      a third conversion part configured to transmit the light of the first color; and
   a filter layer disposed between the substrate and the color conversion layer, the filter layer comprising:
      a first filter overlapping with the first conversion part and having the second color;
      a second filter overlapping with the second conversion part and having the third color;
      a third filter overlapping with the third conversion part and having the first color; and
   an auxiliary filter overlapping with a center of the second conversion part in a plan view and configured to absorb the light of the first color.

2. The display panel of claim 1, wherein the auxiliary filter is disposed on the second conversion part and the second filter is disposed on the auxiliary filter.

3. The display panel of claim 1, wherein the auxiliary filter is disposed between the second conversion part and the second filter.

4. The display panel of claim 3, wherein the wavelength range of the light of the first color partially overlaps with a wavelength range of the light of the third color, and the wavelength range of the light of the first color does not overlap with a wavelength range of the light of the second color.

5. The display panel of claim 3, wherein the auxiliary filter has a fourth color, and
   wherein the first color is a blue color, and the fourth color is a yellow color.

6. The display panel of claim 5, wherein the second color is a red color, and the third color is a green color.

7. The display panel of claim 1, wherein the auxiliary filter is an organic layer.

8. The display panel of claim 1, wherein a thickness of the auxiliary filter in a thickness direction of the substrate ranges from about 0.3 micrometers (μm) to about 2 micrometers (μm).

9. The display panel of claim 1, wherein the auxiliary filter comprises:
   a first auxiliary filter overlapping with the second conversion part; and
   a second auxiliary filter overlapping with the first conversion part.

10. The display panel of claim 9, wherein the first auxiliary filter is disposed between the second conversion part and the second filter, and the second auxiliary filter is disposed between the first conversion part and the first filter.

11. The display panel of claim 1, wherein the first conversion part includes a first illuminant that is configured to absorb the light of the first color and to emit the light of the second color, and
    wherein the second conversion part includes a second illuminant that is configured to absorb the light of the first color and to emit the light of the third color.

12. The display panel of claim 11, wherein a particle size of the first illuminant is different from a particle size of the second illuminant.

13. The display panel of claim 1, further comprising:
    a light blocking member disposed between adjacent filters among the first to third filters.

14. The display panel of claim 1, further comprising:
    a liquid crystal layer disposed between the first display substrate and the second display substrate;
    a polarizing layer disposed on the first display substrate; and
    an in-cell polarizing layer disposed between the color conversion layer and the liquid crystal layer,
    wherein the in-cell polarizing layer includes a plurality of wire grid patterns.

15. The display panel of claim 14, wherein the polarizing layer has a first polarization axis, and the in-cell polarizing layer has a second polarization axis perpendicular to the first polarization axis.

16. A display device comprising:
    a display panel; and
    a light source configured to provide light of a first color to the display panel,
    wherein the display panel comprises:
    a first substrate;
    a second substrate;
    a liquid crystal layer disposed between the first substrate and the second substrate;
    a color conversion layer disposed between the second substrate and the liquid crystal layer, the color conversion layer comprising:
    a first conversion part configured to absorb the light of the first color and to emit light of a second color;
    a second conversion part configured to absorb the light of the first color and to emit light of a third color; and
    a third conversion part configured to transmit the light of the first color; and
    a filter layer disposed between the second substrate and the color conversion layer, the filter layer comprising:
    a first filter overlapping with the first conversion part in a plan view and having the second color;

a second filter overlapping with the second conversion part in a plan view and having the third color; and an auxiliary filter overlapping with a center of the second conversion part in a plan view and configured to absorb the light of the first color.

17. The display device of claim 16, wherein the filter layer further comprises: a third filter overlapping with the third conversion part in a plan view and having the first color.

18. The display device of claim 16, wherein the auxiliary filter comprises:

a first auxiliary filter overlapping with the second conversion part; and a second auxiliary filter overlapping with the first conversion part.

19. The display device of claim 16, wherein the auxiliary filter has a fourth color, and a wavelength range of light of the fourth color does not overlap with a wavelength range of the light of the first color.

20. The display device of claim 19, wherein the first color is a blue color, and the fourth color is a yellow color.

\* \* \* \* \*